United States Patent
Deng (12)

(10) Patent No.: US 6,243,394 B1
(45) Date of Patent: *Jun. 5, 2001

(54) APPARATUS FOR ADSL ACCESS

(75) Inventor: Shuang Deng, Sudbury, MA (US)

(73) Assignee: Verizon Laboratories Inc., Waltham, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/796,759

(22) Filed: Feb. 6, 1997

(51) Int. Cl.[7] .................................................. H04L 12/66
(52) U.S. Cl. ............................................ 370/466; 370/474
(58) Field of Search .................................. 370/466, 467, 370/401, 402, 474, 438; 379/93.31; 395/285

(56) References Cited

U.S. PATENT DOCUMENTS

| | | | |
|---|---|---|---|
| 5,448,565 | * 9/1995 | Chang | 370/438 |
| 5,544,161 | * 8/1996 | Bigham | 370/466 |
| 5,684,799 | * 11/1997 | Bigham | 370/474 |
| 5,708,659 | * 1/1998 | Rostoker | 370/401 |
| 5,790,548 | * 8/1998 | Sistanizadah | 370/401 |

OTHER PUBLICATIONS

Robert Olshansky, "Moving Toward Low–Cost Access to the Information Highway", Telephony, Nov. 7, 1994, pp. 31–37.
Westell Technologies, "World Vision ADSL Asymmetric Digital Subscriber Line", 1996, 37 pages, no month.
Data Communication, Computer Networks and Open Systems, Fred Halsall, Addison–Wesley Publishing Co. pp. 395–397, 1996.*

* cited by examiner

*Primary Examiner*—Brian Zimmerman
(74) *Attorney, Agent, or Firm*—Leonard Charles Suchyta; James K. Weixel

(57) ABSTRACT

An ADSL access device controls communication through one or more ADSL channels. The ADSL access device may be located at a customer location or at a central office. The access device includes an ADSL modem coupled to the ADSL channel, a protocol converter for converting the protocol of data packets and one or more switching port controllers. Each switching port controller in an ADSL access device at a customer location performs data packet filtering on a local area network and forwards data packets to the ADSL channel or to another LAN port. The switching port controllers in the central office ADSL access device control routing of data packets between different ADSL channels and a wide area network.

20 Claims, 9 Drawing Sheets

APPARATUS FOR ADSL ACCESS

FIELD OF THE INVENTION

This invention relates to transmission of data using an asymmetric digital subscriber line (ADSL) channel and, more particularly, to apparatus for accessing an ADSL channel.

BACKGROUND OF THE INVENTION

The rapid growth of the "information highway" has created the need for high-speed, low-cost techniques for transmitting data to and from homes, small businesses, schools and the like. At the data rates of conventional modems, the transmission of detailed graphics, for example, typically requires a time that may be annoying to the user. A web page containing detailed graphics of 100 kilobytes may require 27 seconds for transmission. Optical fiber networks and CATV networks have sufficient bandwidth to permit high speed data transmission. However, the infrastructure is not presently available to provide data services to consumers on optical fiber or CATV networks on a widespread basis and at low cost.

An ADSL standard for data transmission is being developed to address these issues. Data transmission, according to the ADSL standard, permits transmission of simplex and duplex digital data signals over the conventional twisted wire pairs that are used for plain old telephone service (POTS). The digital data signals are transmitted at frequencies above the baseband analog POTS band (0–4 kilohertz). The ADSL standard is a physical layer standard providing for a simplex downstream channel at a maximum rate of 6.2 megabits per second and a minimum rate of 1.544 megabits per second. The ADSL standard also includes a duplex digital channel at optional rates of 64 kilobits per second, 160 kilobits per second, 384 kilobits per second and 576 kilobits per second. The ADSL standard takes advantage of the fact that most consumer applications, such as Internet access, access to online information services, access to private networks and work-at-home applications, require a larger bandwidth into the home than out of the home. ADSL transport technology is described by R. Olshansky in "Moving Toward Low-Cost Access to the Information Highway", Telephony, Nov. 7, 1994, pp. 31–37.

The basic ADSL architecture includes an ADSL interface unit at the telephone company central office (CO) and an ADSL interface unit at the customer location, interconnected by a twisted pair of conductors. Each ADSL interface unit includes a POTS splitter and ADSL modem. The ADSL modem transmits and receives digital data on the twisted pair at the selected ADSL transmission rates. At the central office, the ADSL interface unit receives and transmits digital data from a wide area network. The POTS splitter frequency multiplexes the high speed digital data and the analog POTS signal onto the twisted pair for transmission. The POTS splitter at the customer location decouples the analog POTS signal onto the existing POTS wiring in the home. The ADSL modem receives the ADSL data signals and forwards them to the customers PC or LAN. The interface between the LAN and the ADSL channel must be configured to insure efficient transfer of digital data. Similarly, the interface between the wide area network and the ADSL channel at the CO must be configured to insure efficient transfer of digital data.

SUMMARY OF THE INVENTION

According to a first aspect of the invention, apparatus is provided for controlling data communication between a local area network (LAN) and a remote device through an ADSL channel. The apparatus comprises an ADSL modem coupled to the ADSL channel, a protocol converter coupled to the ADSL modem and a switching port controller coupled between the protocol converter and a port of the LAN. The protocol converter converts the protocol of data packets transmitted from the LAN through the ADSL channel from a LAN protocol to an ADSL protocol and converts the protocol of data packets transmitted through the ADSL channel to the LAN from ADSL protocol to LAN protocol. The switching port controller includes first means for determining if a destination address of a data packet received through the LAN port matches one of the source addresses in the LAN and for forwarding the data packet to the protocol converter when the destination address of the data packet does not match one of the source addresses in the LAN. The switching port controller further includes second means for forwarding data packets received from the protocol converter to the LAN port.

The first means of the switching port controller preferably includes an address table, means for storing in the address table source addresses of data packets received through the LAN port and means for comparing the destination address of the data packet received through the LAN port with the source addresses stored in the address table to determine if the destination address matches one of the source addresses in the LAN.

According to another aspect of the invention, apparatus is provided for controlling data communication between a LAN having a plurality of segments and a remote device through an ADSL channel. The apparatus comprises an ADSL modem coupled to the ADSL channel, a protocol converter coupled to the ADSL modem and a plurality of switching port controllers respectively coupled between the protocol converter and the plurality of LAN segments. Each of the switching port controllers includes a LAN port coupled to one of the LAN segments and first means for determining if a destination address of a data packet received through its LAN port matches one of the source addresses in the LAN and for forwarding the data packet to the protocol converter when the destination address of the data packet does not match one of the source addresses in the LAN. Each of the switching port controllers further includes second means for forwarding data packets received from the protocol converter to its LAN port.

Each switching port controller preferably includes an address table, means for storing in the address table source addresses of devices connected to the LAN port of the switching port controller and means for comparing the destination address of the data packet with the source addresses in the address table to determine routing of the data packet.

When the apparatus includes a plurality of switching port controllers, each switching port controller preferably includes means for forwarding the destination address of the data packet to other ones of the switching port controllers for comparison with the source addresses in the address tables of the other switching port controllers and means for forwarding the data packet to another switching port controller when the destination address matches one of the source addresses in the address table of the other switching port controller.

The second means of each of the switching port controllers preferably includes means for comparing the destination address of data packets received from the protocol converter with the source addresses stored in the address table and means for forwarding the data packet to its LAN port when the destination address of the data packet matches one of the source addresses in the address table.

According to a further aspect of the invention, apparatus is provided for controlling data communication between a wide area network (WAN) and remote devices through a plurality of ADSL channels. The apparatus comprises a WAN protocol converter coupled to the wide area network and a plurality of ADSL channel controllers respectively coupled between the WAN protocol converter and the plurality of ADSL channels. The WAN protocol converter converts the protocol of data packets transmitted to the wide area network from a first protocol to a WAN protocol and converts the protocol of data packets transmitted from the wide area network to one of the ADSL channels from the WAN protocol to the first protocol. Each ADSL channel controller comprises an ADSL modem coupled to one of the ADSL channels and a switching port controller coupled between the WAN protocol converter and the ADSL modem. Each of the switching port controllers comprises first means for determining if a destination address of a data packet received from the protocol converter matches one of the source addresses of devices coupled to its ADSL channel, and for forwarding the data packet to the ADSL modem for transmission through its ADSL channel when the destination address of the data packet matches one of the source addresses of devices coupled to its ADSL channel. Each of the switching port controllers further comprises second means for forwarding the data packets received from its ADSL modem to the WAN protocol converter or to another ADSL channel.

Each of the switching port controllers preferably includes an address table. The first means of each of the switching port controllers preferably comprises means for storing source addresses of devices coupled to its ADSL channel and means for comparing the destination address of the data packet with the source addresses in the address table to determine the routing of the data packet. The second means of each of the switching port controllers preferably includes means for forwarding the destination address of the data packet to other ones of the switching port controllers for comparison with the source addresses stored in the address tables of the other switching port controllers and means for forwarding the data packet to another of the switching port controllers when the destination address of the data packet matches one of the source addresses in the address table of the other switching port controller.

Each of the ADSL channel controllers may further comprise an ADSL protocol converter coupled between the switching port controller and the ADSL modem for converting data packets between ADSL protocol and an internal protocol of the apparatus.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
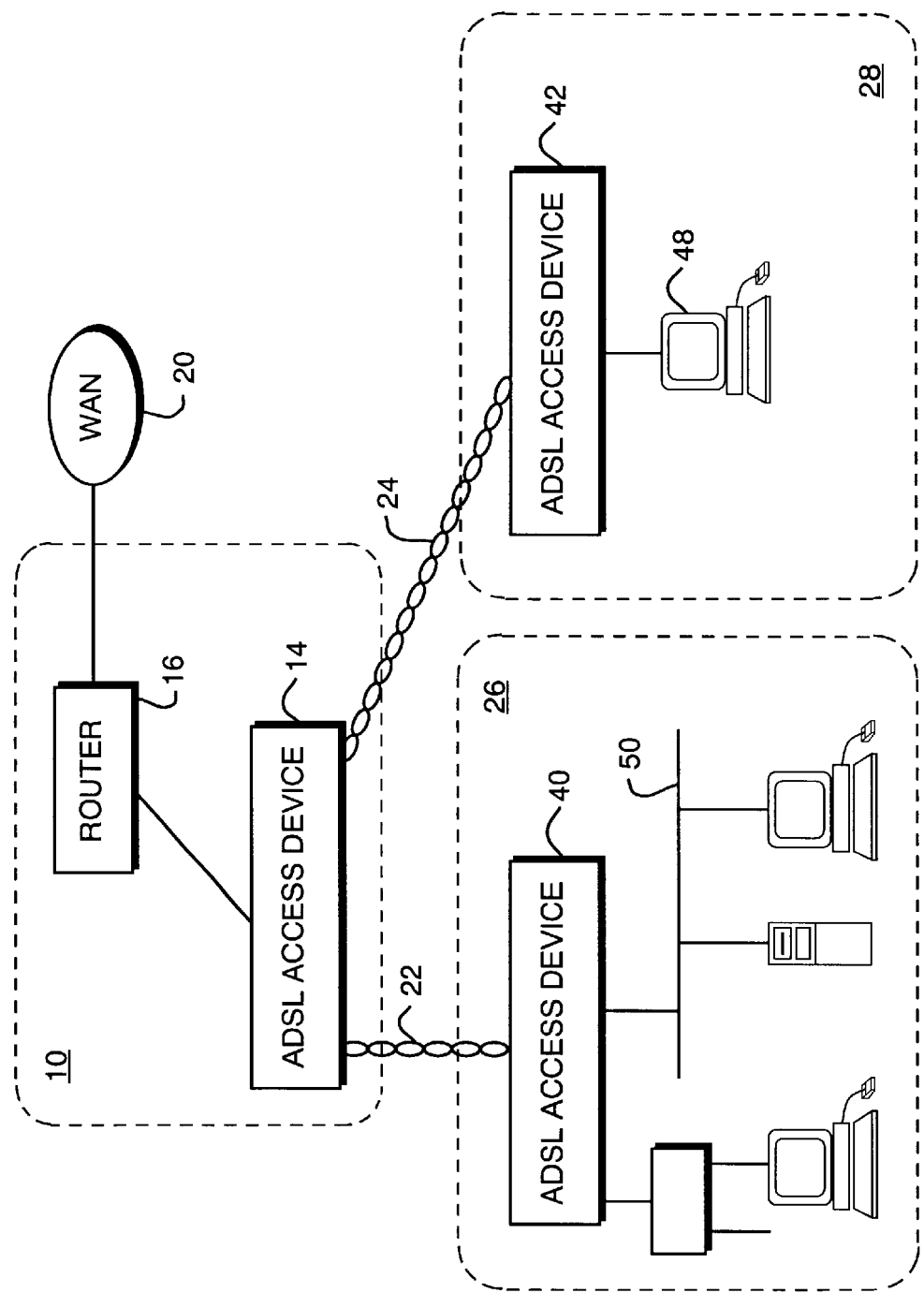
FIG. 1 is a block diagram of a basic ADSL service network.

A block diagram of a basic ADSL service network is shown in FIG. 1. At a central office 10, an ADSL access device 14 is connected to a router 16, directly or through other intermediary switches such as Ethernet switches or frame relay switches. The router 16 provides access to a wide area network (WAN) 20. The ADSL access device 14 receives and transmits digital data from the wide area network via router 16. The ADSL access device 14 includes a POTS splitter which frequency multiplexes the digital data onto twisted pairs 22 and 24 for transmission outside central office 10 on ADSL channels to customer locations 26 and 28, respectively. The POTS splitter in the central office 10 couples the analog POTS signal to a switch which controls POTS service. The ADSL access device 14 further includes ADSL modems which transmit data packets to customer locations 26 and 28 on twisted pairs 22 and 24, respectively, at a selected downstream ADSL transmission rate and which receive data packets transmitted from the customer locations at selected upstream ADSL transmission rates.

Customer location 26 includes an ADSL access device 40, and customer location 28 includes an ADSL access device 42. Each ADSL access device contains a POTS splitter which decouples the analog POTS signal onto the POTS wiring in the home for connection to customer telephone equipment. Each of the ADSL access devices converts the ADSL data signals to appropriate local area network (LAN) format and delivers the converted signals to a workstation, personal computer 48 or to a local area network 50. The ADSL access device may have a single LAN port (device 42) or multiple LAN ports (device 40). The ADSL access devices are described in detail below.

Figure 2:
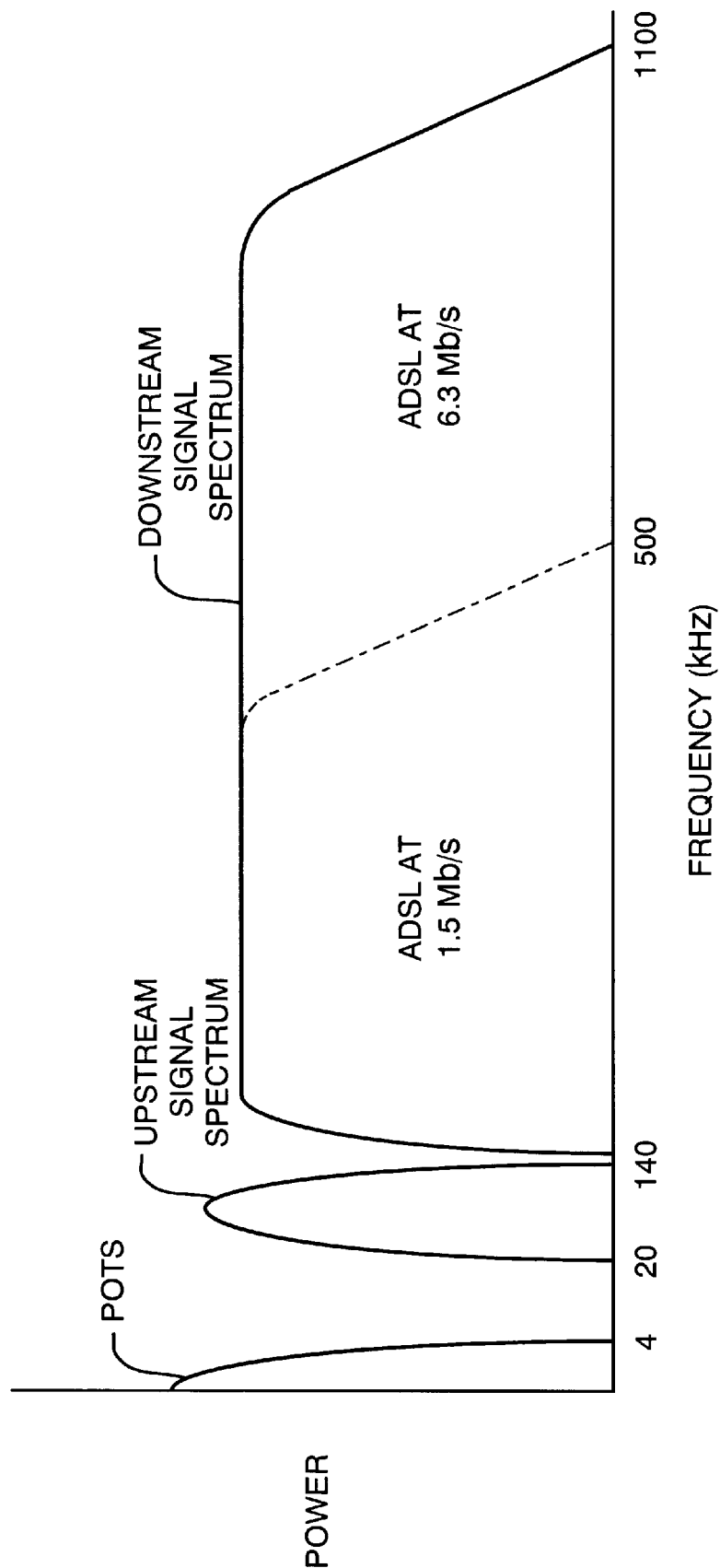
FIG. 2 is a graph of power as a function of frequency, illustrating the ADSL spectrum.

The ADSL standard for data transmission promulgated by ANSI (American National Standards Institute) provides for three simultaneous transport services on twisted pair copper loops, as shown in FIG. 2. Basic analog telephone service occupies the 0 kilohertz to 4 kilohertz band. A high speed simplex channel transmits data downstream from central office 10 to customer locations 26 and 28 at data rates of 1.5 megabits per second to 6.2 megabits per second depending upon the transmission characteristics of the copper loop and the service option selected by the subscriber. A duplex communication channel varies from 160 kilobits per second to 576 kilobits per second, depending upon the characteristics of the loop and the service option selected by the subscriber.

Figure 3:
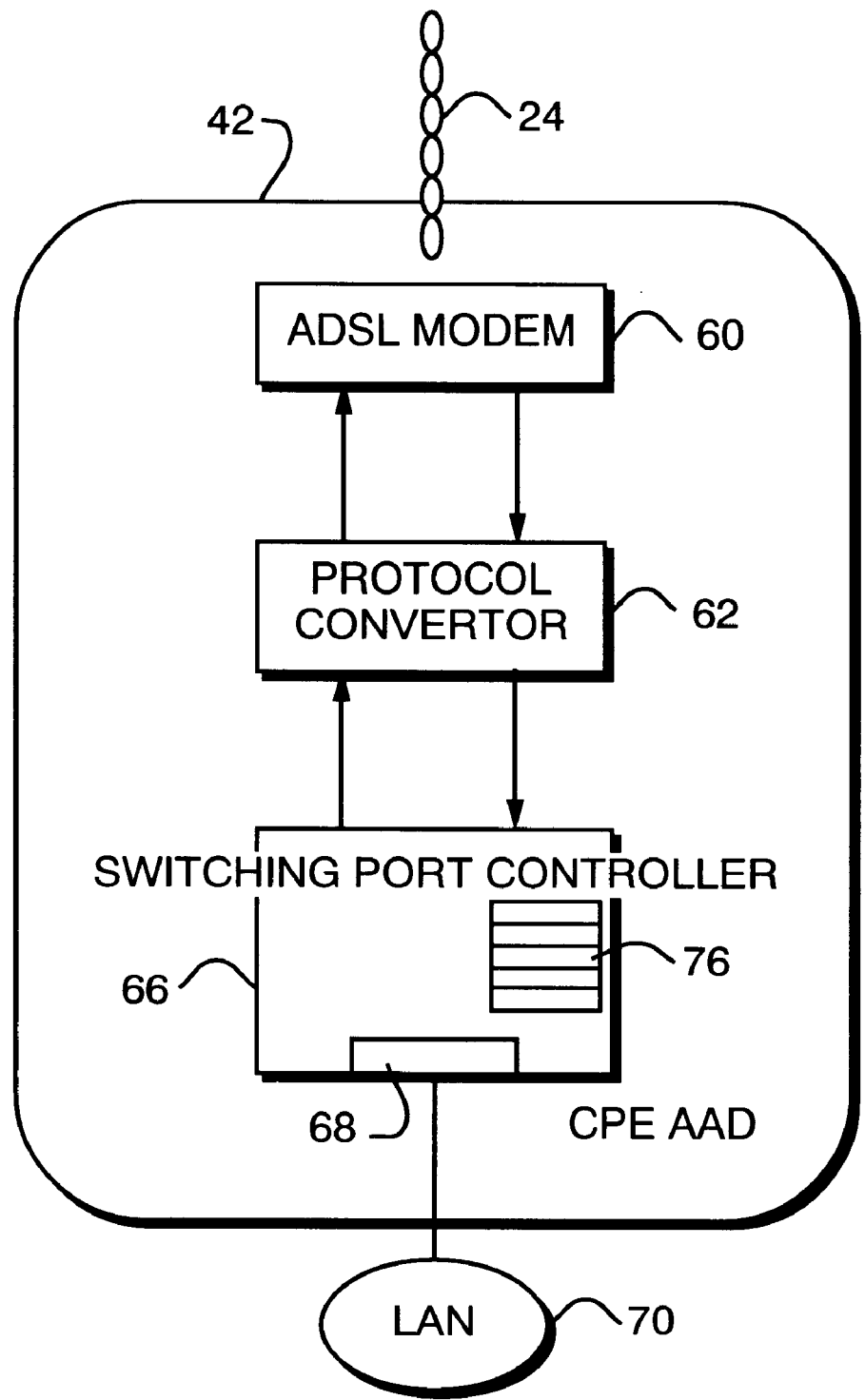
FIG. 3 is a block diagram of a single port ADSL access device for use at a customer location in accordance with the invention.

A block diagram of a single port ADSL access device for use at a customer location is shown in FIG. 3. Like elements in FIGS. 1 and 3 have the same reference numerals. An ADSL modem 60 transmits and receives digital data packets on twisted pair 24 at the selected ADSL data rates and signal levels. Data packets to be transmitted on twisted pair 24 are received from a protocol converter 62, and data packets received on twisted pair 24 are supplied to protocol converter 62. A switching port controller (SPC) 66 has a port 68 for connection to a local area network (LAN) 70. While an Ethernet network is used as an example to describe the present invention, the invention is applicable to other LAN protocols, including Token Ring, FDDI and ATM. The LAN 70 may be a single device, such as a PC or workstation, or may be a network. The customer may have a personal computer or workstation equipped with an Ethernet network interface card, an Ethernet LAN segment, an Ethernet hub, or a router with Ethernet ports. The switching port controller 66 receives data packets from LAN 70 and, if appropriate, forwards the data packets to protocol converter 62. The switching port controller 66 also receives data packets from protocol converter 62 and forwards the data packets to LAN 70. The protocol converter 62 converts the protocol of data packets transmitted from LAN 70 through the ADSL channel from the LAN protocol, such as Ethernet protocol, to an ADSL protocol, such as point-to-point protocol (PPP). The protocol converter 62 also converts the protocol of data packets received through the ADSL channel from the ADSL protocol to the LAN protocol.

Each data packet transmitted on LAN 70 includes a source address of the transmitting device and a destination address of the receiving device. The receiving device may be within LAN 70 or external to LAN 70. When the receiving device, as indicated by the destination address, is external to LAN 70, the data packet is transmitted through the ADSL channel.

The switching port controller 66 includes an address table 76 to enable it to automatically learn the source addresses of devices connected to LAN port 68. Source addresses of data packets transmitted on the local area network 70 are stored in address table 76 on an ongoing basis. After operation for a prescribed time period, the address table 76 contains the source addresses of all active devices in LAN 70. If a device is not active for a predetermined time, it is considered to be inactive, and its source address is removed from address table 76. The address table 76 is used to control transmission of data packets through the ADSL channel. When a data packet is received from LAN 70 through port 68, the destination address of the data packet is compared with the source addresses in address table 76. A match between the destination address and one of the source addresses indicates that the data packet has a local destination and does not require transmission through the ADSL channel. In this case, the data packet may be ignored. When the destination address does not match one of the source addresses in address table 76, the data packet is forwarded to the protocol converter 62. The protocol converter 62 converts the protocol of the data packet from LAN protocol to ADSL protocol and transmits the data packet through the ADSL channel via ADSL modem 60.

Data packets transmitted through the ADSL channel to ADSL access device 42 through twisted pair 24 are received by ADSL modem 60. The received data packets are supplied to protocol converter 62 for conversion of the protocol from ADSL protocol to LAN protocol. Each data packet is then forwarded via switching port controller 66 to LAN 70. The destination address of the data packet identifies the receiving device in LAN 70. Since the access device shown in FIG. 3 has only one LAN port, reference to address table 76 is not required.

Figure 4:
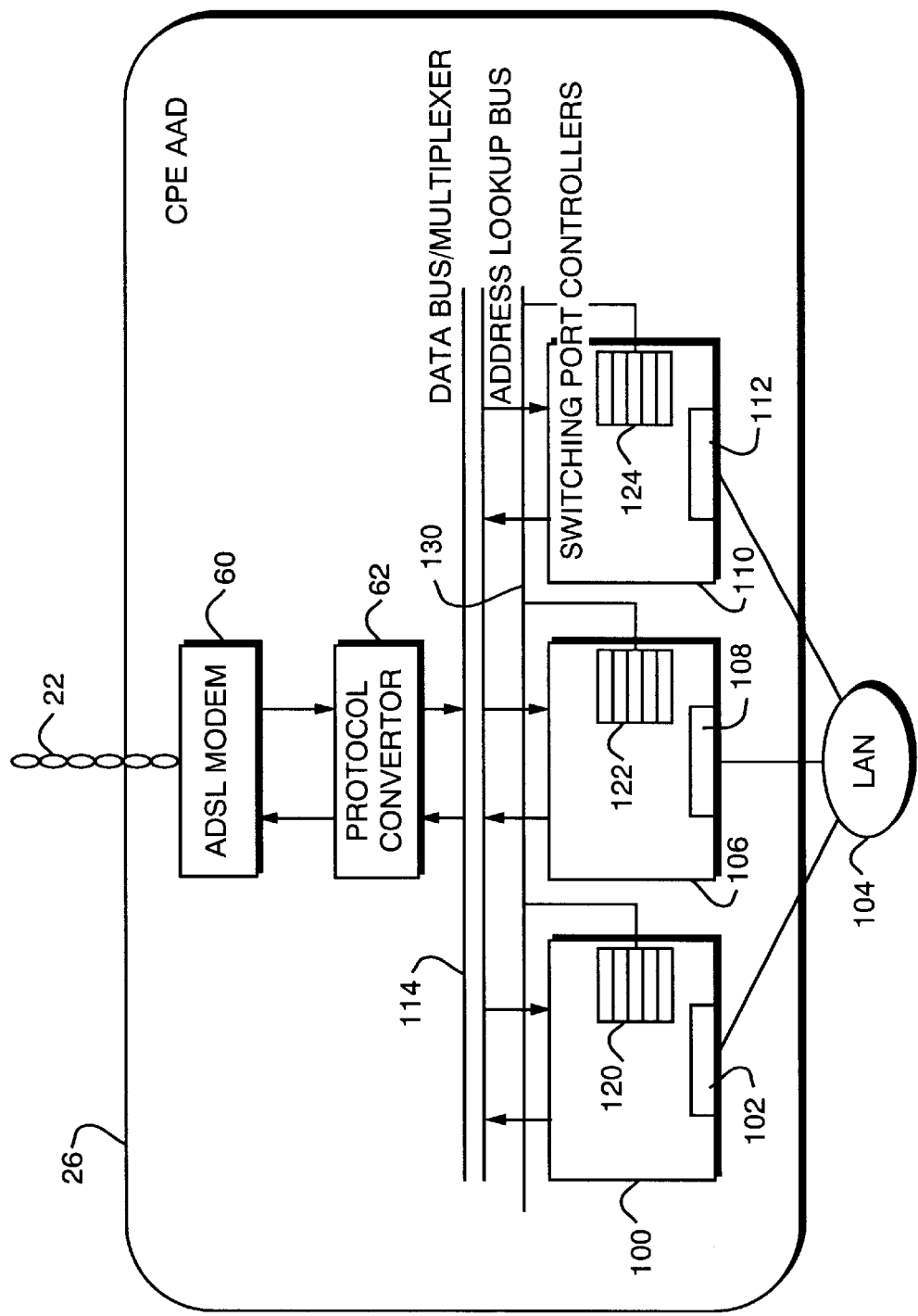
FIG. 4 is a block diagram of a multiple port ADSL access device for use at a customer location in accordance with the invention.

A block diagram of a multiple port ADSL access device for use at a customer location is shown in FIG. 4. Like elements in FIGS. 1, 3 and 4 have the same reference numerals. The multiple port ADSL access device includes two or more switching port controllers connected to different ports of a LAN. In the example of FIG. 4, the ADSL access device 26 includes a switching port controller 100 having a port 102 connected to a LAN 104, a switching port controller 106 having a port 108 connected to LAN 104, and a switching port controller 110 having a port 112 connected to LAN 104. Typically, switching port controllers 100, 106 and 110 are connected to different devices or segments of the same LAN. Switching port controllers 100, 106 and 110 may be interconnected to protocol converter 62 by a data bus 114. Switching port controllers 100, 106 and 110 include address tables 120, 122 and 124, respectively. An. address lookup bus 130 interconnects switching port controllers 100, 106 and 110.

The ADSL access device 26 operates as follows. Data packets received by the access device 26 through each of the LAN ports 102, 108 and 112 are forwarded in accordance with the associated destination addresses. When the data packet is being sent to a device connected to the same LAN port as the source device, the switching port controller ignores that data packet. When the data packet is being transmitted to a device in LAN 104 connected to a different LAN port of access device 26, the data packet is forwarded to the appropriate switching port controller for transmission to the destination device. When the data packet is being sent to a device external to LAN 104, the data packet is forwarded to protocol converter 62 for protocol conversion and then is forwarded through ADSL modem 60 to the ADSL channel.

Each of the switching port controllers 100, 106 and 110 automatically learns the source addresses of devices connected to the respective LAN ports. In particular, the source addresses of data packets received through each of the LAN ports 102, 108 and 112 are stored in the respective address tables 120, 122 and 124 on an ongoing basis. After operation for a prescribed time period, the address tables contain source addresses of the active devices in each LAN segment. Source addresses that are not active for a predetermined time are removed from the address tables.

Figure 7:
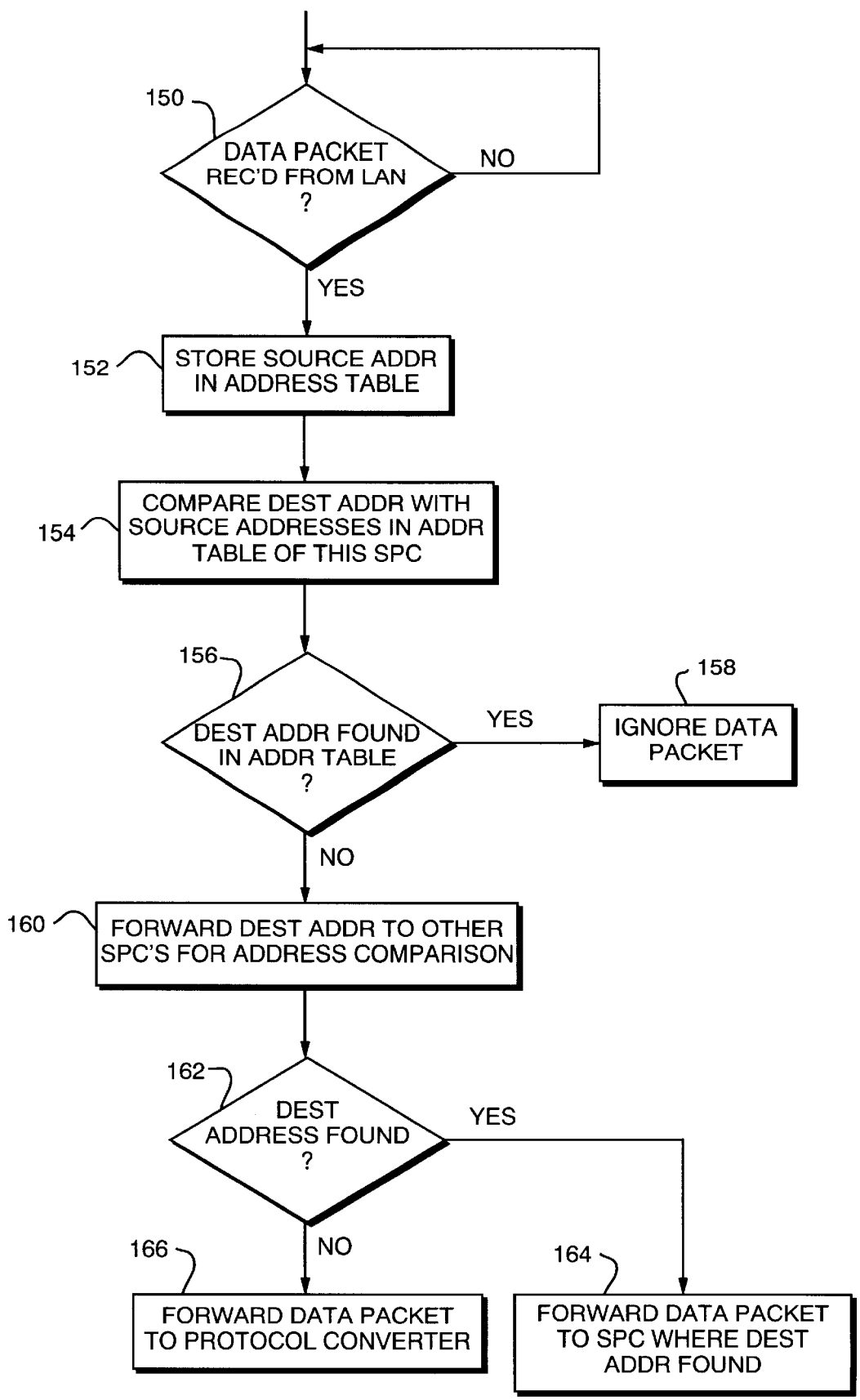
FIG. 7 is a flow diagram showing transmission of data packets from a LAN to a remote device through an ADSL channel with the multiple port ADSL access device of FIG. 4.

The operation of each switching port controller, in processing data packets received from the LAN 104, is illustrated in the flow chart of FIG. 7. Although operation of the switching port controller 100 is described, it will be understood that operation of the other switching port controllers in the ADSL access device 26 is the same as that of switching port controller 100. When a data packet is received from LAN 104 through LAN port 102 in step 150, the source address of the data packet is stored in address table 120 in step 152. Then, the destination address of the data packet is compared with the source addresses in address table 120 in step 154. If it is determined in step 156 that the destination address matches one of the source addresses in address table 120, the data packet is ignored in step 158. In this case, the data packet is being sent to another device within the LAN segment connected to LAN port 102. When the destination address is not found in address table 120, the destination address is forwarded on address lookup bus 130 to switching port controllers 106 and 110 for comparison with the source addresses in address tables 122 and 124 in step 160. When it is determined in step 162 that the destination address matches one of the source addresses in one of the other address tables, the data packet is forwarded in step 164 to the switching port controller where the destination address was found. For example, assume that the destination address matches one of the source addresses in address table 124. In that case, the data packet is forwarded from switching port controller 100 to switching port control after 110. The switching port controller 110 then forwards the data packet through LAN port 112 to the appropriate device in that LAN segment. When the destination address is not found in any of the address tables in step 162, the data packet is forwarded to the protocol converter 62 in step 166. In this case, the data packet is to be transmitted through the ADSL channel. The protocol converter 62 converts the data packet from LAN format to ADSL format and transmits the data packet through the ADSL channel via ADSL modem 60.

Data packets transmitted through the ADSL channel to access device 26 via twisted pair 22 are forwarded to protocol converter 62 through ADSL modem 60. The data packets are converted from ADSL protocol to LAN protocol and are forwarded via data bus 114 to switching port controllers 120,122 and 124. The destination address of the data packet is compared by each of the switching port controllers 100, 106 and 110 with the source addresses in address tables 120, 122 and 124, respectively. When a match is found between the destination address and one of the source addresses, the data packet is forwarded by that switching port controller through its LAN port to the LAN 104. The other switching port controllers take no action with respect to the data packet.

Figure 5:
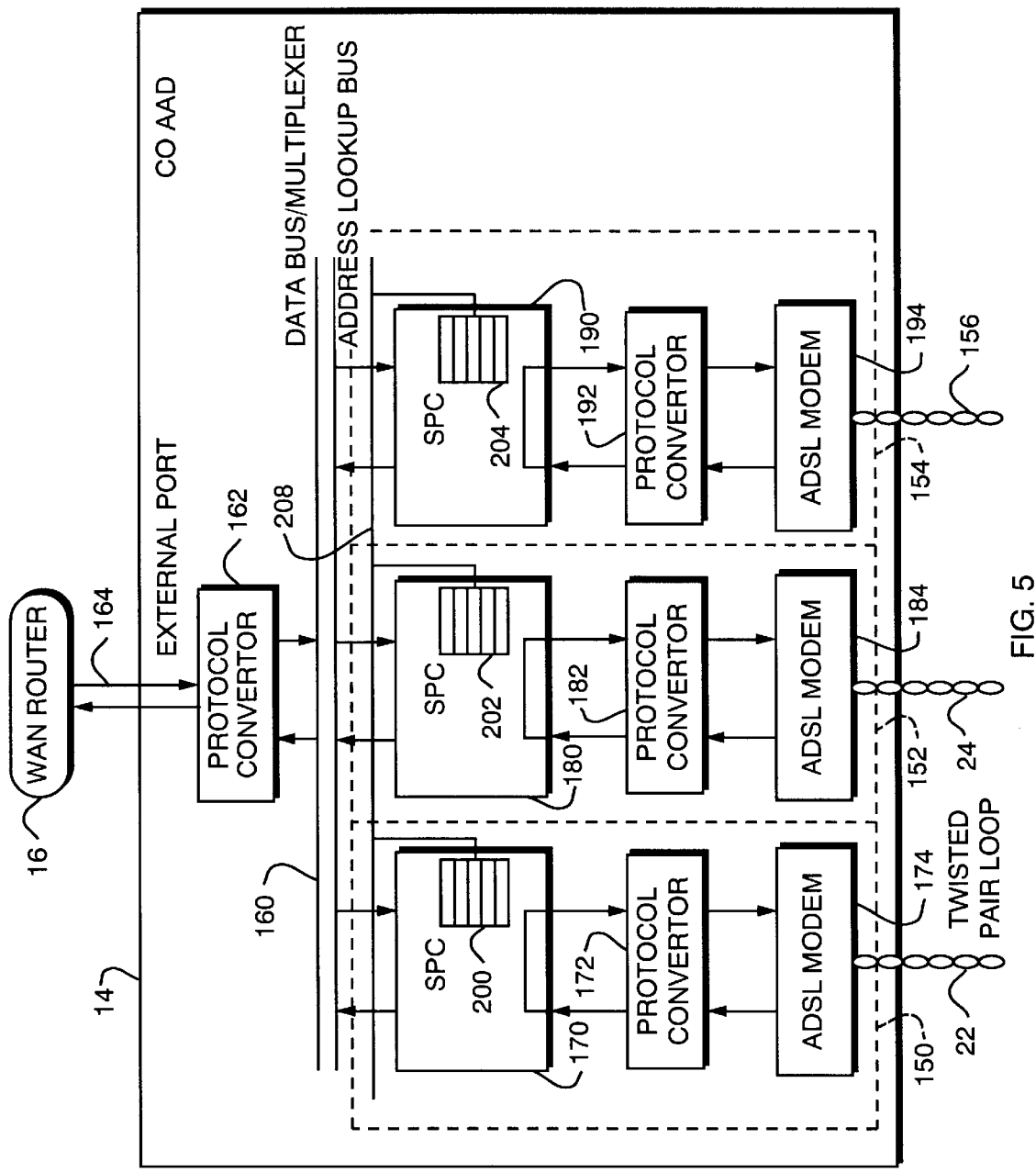
FIG. 5 is a block diagram of a single level ADSL access device for use at a central office in accordance with the invention.

A block diagram of a multiple port ADSL access device for use at a central office (CO) is shown in FIG. 5. Like elements in FIGS. 1 and 5 have the same reference numerals. The multiple port ADSL access device includes two or more ADSL channel controllers connected to different ADSL channels. In the example of FIG. 5, the ADSL access device 14 includes an ADSL channel controller 150 connected to twisted pair 22, an ADSL channel controller 152 connected to twisted pair 24 and an ADSL channel controller 154 connected to a twisted pair 156. The ADSL channel controllers 150, 152 and 154 are coupled via a data bus 160 to a WAN protocol converter 162. The WAN protocol converter 162 transmits and receives signals to wide area network router 16 via an external port 164. Each of the ADSL channel controllers includes an ADSL modem coupled to the twisted pair of the ADSL channel and a switching port controller coupled via data bus 160 to protocol converter 162, and may include an ADSL protocol converter coupled between the switching port controller and the ADSL modem. Thus, ADSL channel controller 150 includes switching port controller 170, ADSL protocol converter 172 and ADSL modem 174; ADSL controller 152 includes switching port controller 180, ADSL protocol converter 182 and ADSL modem 184; and ADSL channel controller 154 includes switching port controller 190, ADSL protocol converter 192 and ADSL modem 194. The ADSL protocol converters 172, 182 and 192 convert the protocol of data packets received on the ADSL channel from ADSL protocol to an internal format of the access device, such as for example direct memory access (DMA) bus, and convert data packets transmitted to the ADSL channel from the internal protocol to ADSL protocol. The WAN protocol converter 162 converts the protocol of data packets received from the wide area network from WAN protocols, such as frame relay or ATM protocol, to the internal protocol of the access device and converts the protocol of data packets transmitted to the wide area network from internal protocol to WAN protocol. In some instances, it may be desirable to eliminate one of the protocol conversions and to convert directly from ADSL protocol to WAN protocol. In this case, ADSL protocol converters 172, 182 and 192 may be eliminated.

The switching port controllers 170, 180 and 190 include address tables 200, 202 and 204, respectively. The address tables are coupled together by an address lookup bus 208. Each of the address tables 200, 202 and 204 stores the source addresses of devices connected to the respective ADSL channels at customer locations. The source addresses in each of the address tables may be stored by an automatic learning process, as described above in connection with FIG. 3, or may be preprogrammed in the switching port controllers.

Figure 8:
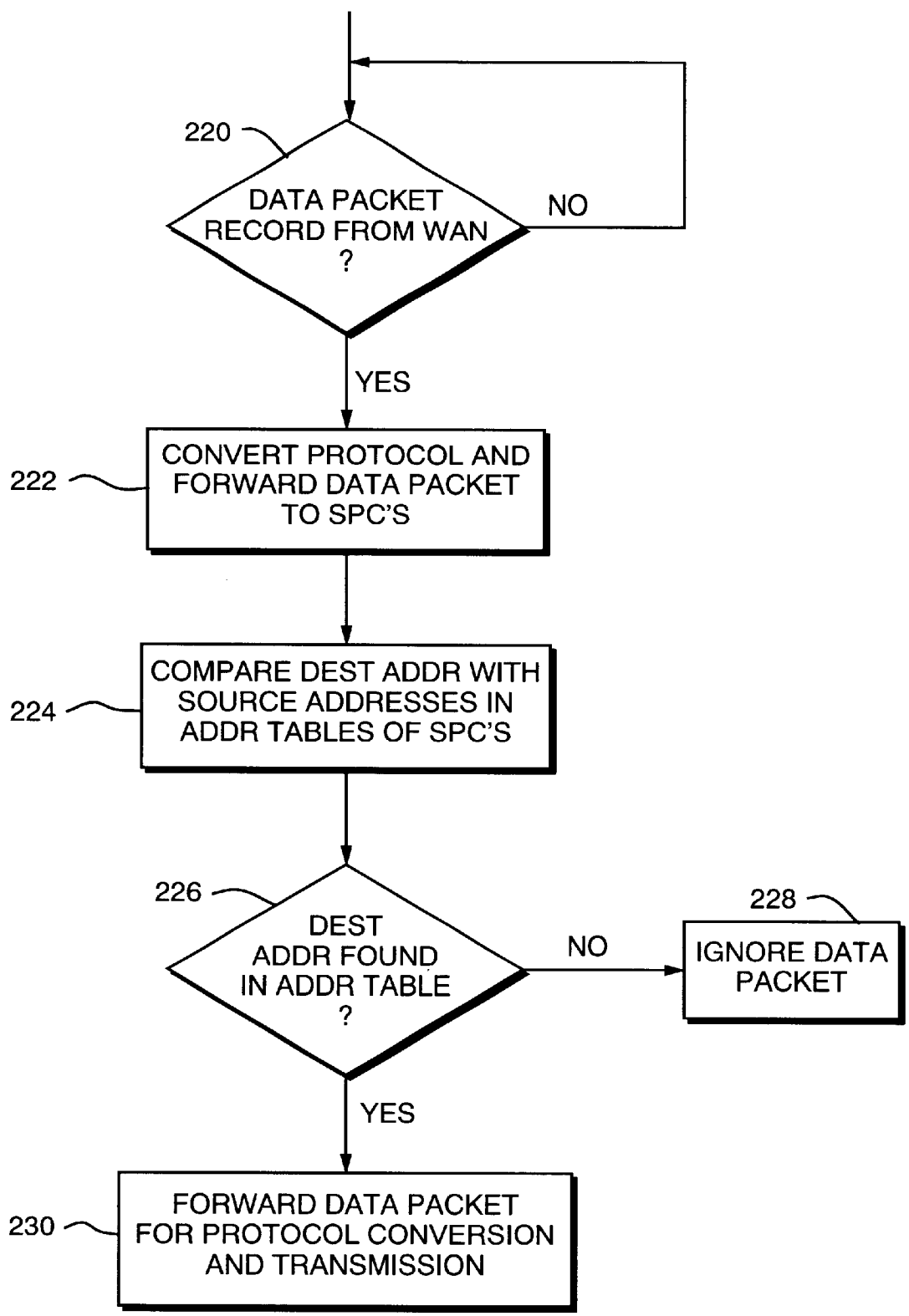
FIG. 8 is a flow diagram showing transmission of data packets from a wide area network through an ADSL channel with the ADSL access device of FIG. 5.

The operation of ADSL access device 14, in processing data packets received from the wide area network, is illustrated in the flow chart of FIG. 8. Data packets are received from the wide area network via WAN router 16 in step 220. The protocol converter 162 performs protocol conversion of the data packet and supplies the converted data packet via data bus 160 to switching port controllers 170, 180 and 190 in step 222. The switching port controllers compare the destination address of the data packet with the source addresses in the respective address tables 200, 202 and 204 in step 224. In the switching port controllers where the destination address does not match any of the source addresses in step 226, the data packet is ignored in step 228. When a match between the destination address and one of the source addresses is found in step 226, the data packet is forwarded by that switching port controller to its associated ADSL protocol converter for protocol conversion and transmission in step 230. For example, when the destination address is found in address table 204, the data packet is forwarded by switching port controller 190 to protocol converter 192. Protocol converter 192 forms protocol conversion of the data packet to ADSL format and forwards the data packet through the ADSL channel on twisted pair 156 via ADSL modem 194.

Figure 9:
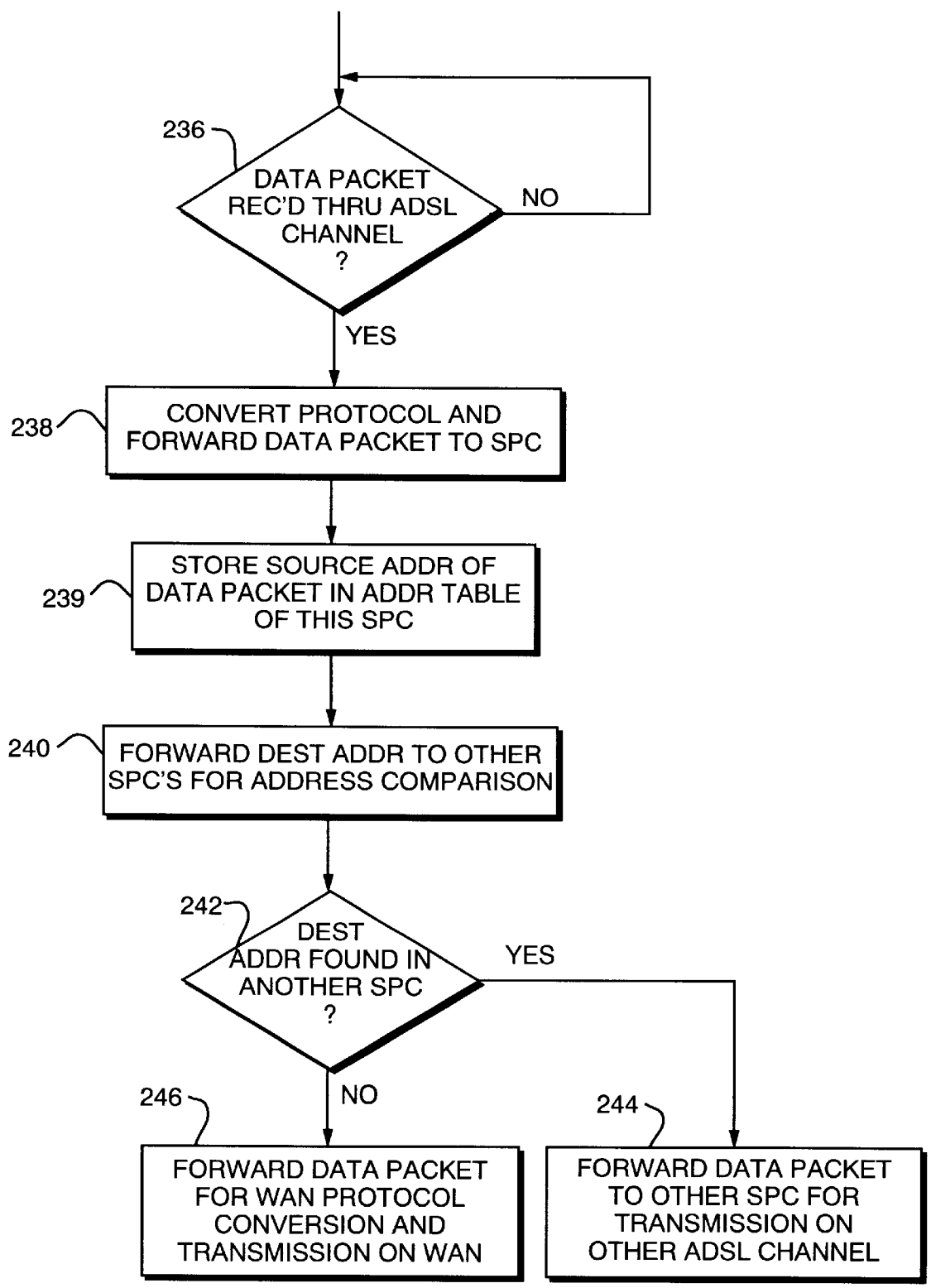
FIG. 9 is a flow diagram showing transmission of data packets from an ADSL channel to a wide area network or another ADSL channel with the ADSL access device of FIG. 5.

The operation of the ADSL access device 14, in processing data packets received through one of the ADSL channels, is illustrated in the flow chart of FIG. 9. The operation of each of the ADSL channel controllers 150, 152 and 154 is the same. A data packet received by one of the ADSL channel controllers through its ADSL channel in step 236 is forwarded via the ADSL modem to its associated ADSL protocol converter. The ADSL protocol converter performs protocol conversion from ADSL protocol to internal protocol and forwards the converted data packet to the switching port controller in step 238. The source address of the data packet is stored in the address table of that switching port controller in step 239. The data packet may be addressed to the wide area network or to a device connected to one of the other ADSL channels. For example, a data packet received on twisted pair 2Z is forwarded to switching port controller 170 via ADSL modem 174 and protocol converter 172. The source address is stored by switching port controller 170 in address table 200. The destination address is forwarded on address lookup bus 208 to switching port controllers 180 and 190 for address comparison between the destination address of the data packet and the source addresses in address tables 202 and 204 in step 240. When the destination address matches a source address in one of the tables in step 242, the data packet is forwarded to the corresponding switching port controller in step 244. For example, when the destination address matches a source address in address table 204, the data packet is forwarded from switching port controller 170 to switching port controller 190. The data packet is then transmitted through the ADSL channel on twisted pair 156 to the destination device. When the destination address is not found in one of the address tables in step 242, the data packet is forwarded via data bus 160 to WAN protocol converter 162 in step 246. The WAN protocol converter 162 converts the data packet to WAN protocol and forwards the converted data packet to WAN router 16 for transmission on the wide area network.

As indicated above, the ADSL channel controllers 150, 152 and 154, each including a switching port controller, an ADSL protocol converter and an ADSL modem, are connected to protocol converter 162 via data bus 160. The data bus 160 may comprise a high speed backplane which forms a switch. The access device shown in FIG. 5 and described above has a single level data bus, or backplane. The number of ports that can be attached to a backplane is usually limited by the backplane speed. A central office ADSL access device can include a switching backplane having more than one level by cascading the structure shown in FIG. 5 to increase the number of ports.

Figure 6:
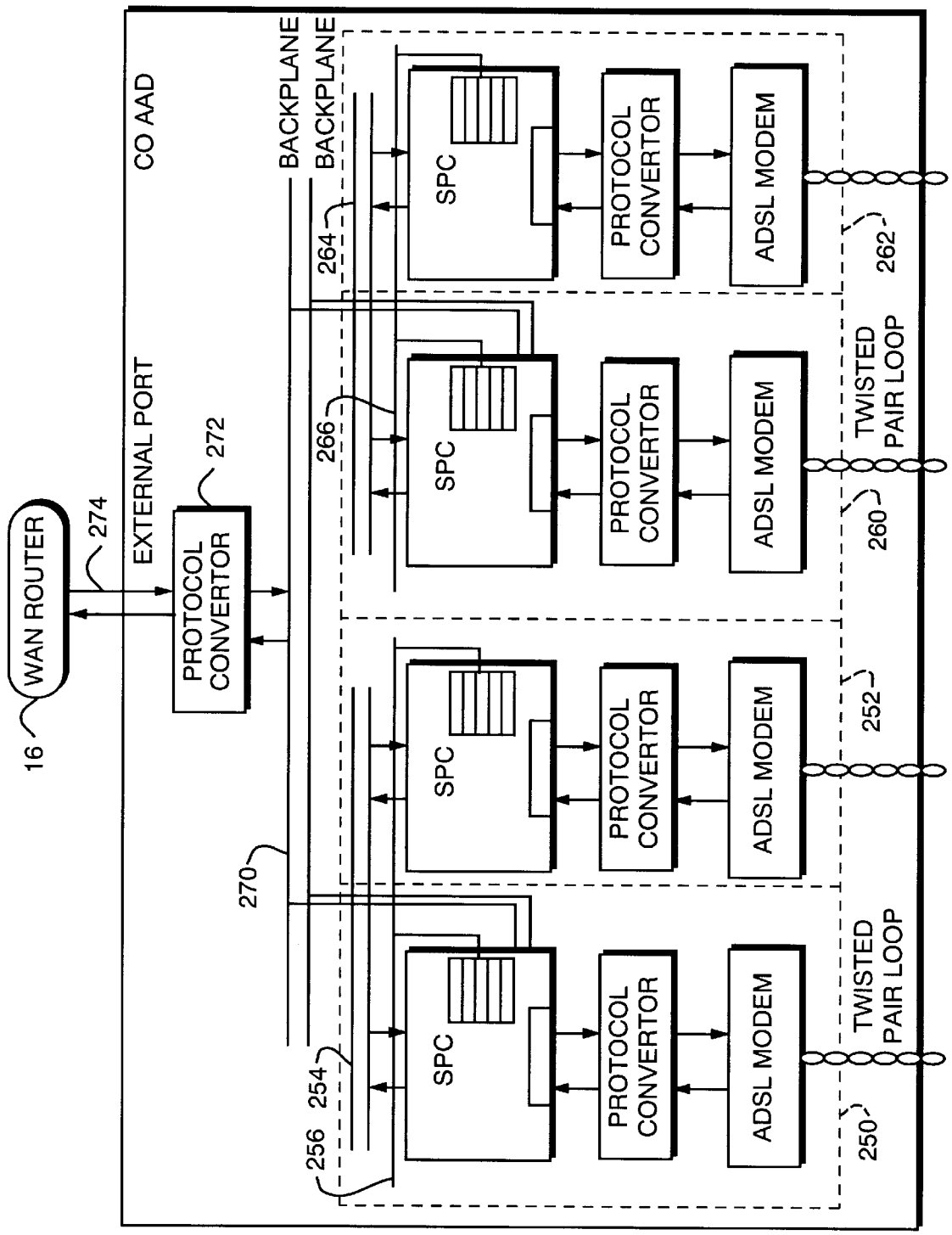
FIG. 6 is a block diagram of a multiple level ADSL access device for use at a central office in accordance with the invention.

A block diagram of a multiple level switching central office access device is shown in FIG. 6. An ADSL channel controller 250 and an ADSL channel controller 252 are interconnected by a data bus 254, or backplane, and an address lookup bus 256 to form a first group of ADSL channel controllers. An ADSL channel controller 260 and an ADSL channel controller 262 are interconnected by a data bus 264, or backplane, and address lookup bus 266 to form a second group of ADSL channel controllers. The first and second groups of ADSL channel controllers are interconnected by a data bus 270, or backplane, to a WAN protocol converter 272. The WAN protocol converter 272 is coupled via an external port of the access device to WAN router 16. The multilevel access device of FIG. 6 permits a larger number of ADSL channels to be switched without degrading performance. Each group of ADSL channel controllers places only one load on data bus 270.

The switching port controllers in the multiport access devices shown in FIGS. 4 to 6 may be implemented, for example, with switched Ethernet port controllers such as the Symbios Logic SYM 92C500. A subset of the functions of this device may be utilized to implement the switching port controller of the single port access device shown in FIG. 3. The protocol converters utilized in the different embodiments of the access device may be implemented, for example, with the Motorola 68302. The ADSL access device of the present invention may utilize existing components for cost effectiveness and transmission performance improvement. The invention avoids the use of bridges and routers, and relies upon switches instead for high speed operation. Packet delay is typically several milliseconds for bridges and routers, but only tens of microseconds for switches. The access device is modular and permits the number of switched ports to be increased. The ADSL access device of the present invention provides protocol conversion and address filtering with specialized devices, as opposed to general purpose processors and software. The Ethernet switching function, and more generally, the data link layers, are integrated into an ADSL access device. The network architecture treats a community access network as an extended LAN with customer location addresses visible to the router and other networking devices at the central office. The access device uses hierarchial processing to filter and switch local traffic before conducting protocol conversions for the upstream traffic. A similar process is used in the reverse order for downstream traffic.

While there have been shown and described what are at present considered the preferred embodiments of the present invention, it will be obvious to those skilled in the art that various changes and modifications may be made therein without departing from the scope of the invention as defined by the appended claims.

What is claimed is:

1. Apparatus for controlling data communication between a local area network (LAN) having a plurality of LAN segments and a remote device through an ADSL channel, comprising:

an ADSL modem coupled to the ADSL channel;

a protocol converter coupled to the ADSL modem for converting the protocol of data packets transmitted from the LAN through the ADSL channel from a LAN protocol to an ADSL protocol and for converting the protocol of data packets transmitted through the ADSL channel to the LAN from the ADSL protocol to the LAN protocol; and a plurality of switching port controllers respectively coupled between said protocol converter and said plurality of LAN segments, said switching port controllers each comprising a LAN port coupled to one of said LAN segments, first means for determining if a destination address of a data packet received through its LAN port matches one of the source addresses in the LAN and for forwarding the data packet to the protocol converter when the destination address of the data packet does not match one of the source addresses in the LAN, and second means for selectively forwarding data packets received from the protocol converter to its LAN port, wherein said switching port controllers are interconnected by an address bus and a data bus, wherein each of said switching port controllers further comprises an address table and wherein said first means of each of said switching port controllers comprises means for storing source addresses of data packets received through its LAN port in said address table and means for comparing the destination address of the data packet received through its LAN port with the source addresses stored in said address table to determine routing of the data packet, wherein said first means of each of said switching port controllers further comprises means for forwarding the destination address of the data packet on said address bus to other ones of said switching port controllers for comparison with the source addresses stored in the address tables of said other switching port controllers and means for forwarding the data packet on said data bus to another of said switching port controllers when the destination address of the data packet matches one of the source addresses in the address table of the other switching port controller.

2. Apparatus for controlling data communication as defined in claim 1, wherein said LAN protocol comprises Ethernet protocol and wherein said ADSL protocol comprises point-to-point protocol (PPP).

3. Apparatus for controlling data communication as defined in claim 1, wherein said second means of each of said switching port controllers includes means for comparing the destination address of data packets received from the protocol converter with the source addresses stored in said address table and means for forwarding the data packet to its LAN port when the destination of the data packet matches one of the source addresses in the address table.

4. Apparatus for controlling data communication as defined in claim 1 wherein said second means of each of said switching port controllers further includes means for storing in said address table source addresses of data packets received through its ADSL channel.

5. Apparatus for controlling data communication between a wide area network (WAN) and remote devices through a plurality of ADSL channels, comprising:

a WAN protocol converter coupled to the wide area network for converting the protocol of data packets transmitted to the wide area network from a first protocol to a WAN protocol and for converting the protocol of data packets transmitted from the wide area network to one of the ADSL channels from the WAN protocol to the first protocol; and a plurality of ADSL channel controllers respectively coupled between said WAN protocol converter and said plurality of ADSL channels, each of said ADSL channel controllers comprising an ADSL modem coupled to one of said ADSL channels and a switching port controller coupled between said WAN protocol converter and said ADSL modem, each of said switching port controllers comprising first means for determining if a destination address of a data packet received from the protocol converter matches one of the source addresses of devices coupled to its ADSL channel and for forwarding the data packet to the ADSL modem for transmission through its ADSL channel when the destination address of the data packet matches one of the source addresses of devices coupled to its ADSL channel, and second means for forwarding data packets received from its ADSL modem to the WAN protocol converter or to another ADSL channel, wherein said ADSL channel controllers are interconnected by an address bus and a data bus, wherein each of said switching port controllers further comprises an address table and wherein said first means of each of said switching port controllers comprises means for storing source addresses of devices coupled to its ADSL channel and means for comparing the destination address of the data packet with the source addresses in the address table to determine the routing of the data packet, wherein said second means of each of said switching port controllers includes means for forwarding the destination address of the data packet on said address bus to other ones of said switching port controllers for comparison with the source addresses stored in the address tables of said other switching port controllers and means for forwarding the data packet on said data bus to another of said switching port controllers when the destination address of the data packet matches one of the source addresses in the address table of the other switching port controller.

6. Apparatus for controlling data communication as defined in claim 5 wherein said ADSL channel controllers are coupled to said WAN protocol converter by a single level data bus.

7. Apparatus for controlling data communication as defined in claim 5 wherein said ADSL channel controllers are coupled together by a first level data bus and are coupled to said WAN protocol converter by a second level data bus.

8. Apparatus for controlling data communication as defined in claim 5, wherein said first protocol comprises an internal protocol and wherein each of said ADSL channel controllers further comprises an ADSL protocol converter coupled between said switching port controller and said ADSL modem for converting between said internal protocol and an ADSL protocol.

9. Apparatus for controlling data communication as defined in claim 5, wherein said first protocol comprises an ADSL protocol.

10. Apparatus for controlling data communication between a wide area network (WAN) and remote devices through a plurality of ADSL channels, comprising:

a WAN protocol converter coupled to the wide area network for converting the protocol of data packets transmitted to the wide area network from an internal protocol to a WAN protocol and for converting the protocol of data packets transmitted from the wide area network to one of the ADSL channels from the WAN protocol to the internal protocol; and a plurality of ADSL channel controllers respectively coupled between said WAN protocol converter and said plurality of ADSL channels, each of said ADSL channel controllers comprising an ADSL modem coupled to one of said ADSL channels, an ADSL protocol converter coupled to said ADSL modem for converting between said internal protocol and an ADSL protocol, and a switching port controller coupled between said ADSL protocol converter and said WAN protocol converter, each of said switching port controllers comprising first means for determining if a destination address of a data packet received from the WAN protocol converter matches one of the source addresses of devices coupled to its ADSL channel and for forwarding the data packet to the ADSL modem for transmission through its ADSL channel when the destination address of the data packet matches one of the source addresses of devices coupled to its ADSL channel, and second means for forwarding data packets received from its ADSL protocol converter to the WAN protocol converter or to another ADSL channel, wherein said ADSL channel controllers are interconnected by an address bus and a data bus, wherein each of said switching port controllers further comprises an address table and wherein said first means of each of said switching port controllers comprises means for storing source addresses of devices coupled to its ADSL channel and means for comparing the destination address of the data packet with the source addresses in the address table to determine the routing of the data packet, wherein said second means of each of said switching port controllers includes means for forwarding the destination address of the data packet on said address bus to other ones of said switching port controllers for comparison with the source addresses stored in the address tables of said other switching port controllers and means for forwarding the data packet on said data bus to another of said switching port controllers when the destination address of the data packet matches one of the source addresses in the address table of the other switching port controller.

11. An ADSL access device for controlling data communication between a local area network (LAN) having a plurality of LAN segments and a remote device through an ADSL channel, comprising:

an ADSL modem coupled to the ADSL channel;

a protocol converter coupled to the ADSL modem for converting the protocol of data packets transmitted from the LAN through the ADSL channel from a LAN protocol to an ADSL protocol and for converting the protocol of data packets transmitted through the ADSL channel to the LAN from the ADSL protocol to the LAN protocol; and a plurality of switching port controllers respectively coupled between said protocol converter and said plurality of LAN segments, said switching port controllers being interconnected by an address bus and a data bus, said switching port controllers each comprising:

a LAN port coupled to one of said LAN segments;

means for forwarding a data packet received through the LAN port of the switching port controller to the protocol converter when a destination address of the data packet indicates that the data packet is addressed outside the LAN; and means for forwarding the data packet to another of said switching port controllers on the data bus when the destination address of the data packet indicates that the data packet is addressed to a LAN segment connected to the other switching port controller, wherein the data packet is transmitted to the destination address of the data packet through the other switching port controller and is not transmitted through the protocol converter and the ADSL modem to the remote device through the ADSL channel when the destination address of the data packet indicates that the data packet is addressed to a LAN segment connected to the other switching port controller.

12. An ADSL access device for controlling data communication between a wide area network (WAN) and remote devices through a plurality of ADSL channels, comprising:

a WAN protocol converter coupled to the wide area network for converting the protocol of data packets transmitted to the wide area network from a first protocol to a WAN protocol and for converting the protocol of data packets transmitted from the wide area network to one of the ADSL channels from the WAN protocol to the first protocol; and a plurality of ADSL channel controllers respectively coupled between said WAN protocol converter and said plurality of ADSL channels, each of said ADSL channel controllers comprising an ADSL modem coupled to one of said ADSL channels and a switching port controller coupled between said WAN protocol converter and said ADSL modem, said ADSL channel controllers being interconnected by an address bus and a data bus, each of said switching port controllers comprising:

means for forwarding a data packet received through the ADSL channel of the ADSL channel controller to the WAN protocol converter when a destination address of the data packet indicates that the data packet is addressed to the WAN; and means for forwarding the data packet to another of said ADSL channel controllers on the data bus when the destination address of the data packet indicates that the data packet is addressed to the ADSL channel connected to the other ADSL channel controller, wherein the data packet is transmitted to the destination of the data packet through the other ADSL channel controller and is not transmitted through the WAN protocol converter to the WAN when the destination address of the data packet indicates that the data packet is addressed to the ADSL channel connected to the other ADSL channel controller.

13. An ADSL access device for controlling data communication between a wide area network (WAN) and remote devices through a plurality of ADSL channels, comprising:

a WAN protocol converter coupled to the wide area network for converting the protocol of data packets transmitted to the wide area network from an internal protocol to a WAN protocol and for converting the protocol of data packets transmitted from the wide area network to one of the ADSL channels from the WAN protocol to the internal protocol; and a plurality of ADSL channel controllers respectively coupled between said WAN protocol converter and said plurality of ADSL channels, each of said ADSL channel controllers comprising an ADSL modem coupled to one of said ADSL channels, an ADSL protocol converter coupled to said ADSL modem for converting between said internal protocol and an ADSL protocol, and a switching port controller coupled between said ADSL protocol converter and said WAN protocol converter, said ADSL channel controllers being interconnected by an address bus and a data bus, each of said switching port controllers comprising:

means for forwarding a data packet received through the ADSL channel of the ADSL channel controller to the WAN protocol converter when a destination address of the data packet indicates that the data packet is addressed to the WAN; and means for forwarding the data packet to another of said ADSL channel controllers on the data bus when the destination address of the data packet indicates that the data packet is addressed to the ADSL channel connected to the other ADSL channel controller, wherein the data packet is transmitted to the destination of the data packet through the other ADSL channel controller and is not transmitted through the WAN protocol converter to the WAN when the destination address of the data packet indicates that the data packet is addressed to the ADSL channel connected to the other ADSL channel controller.

14. A device for controlling communications between a local area network (LAN) having a plurality of LAN segments and a remote device via an ADSL communication channel, comprising:

an ADSL modem coupled to the ADSL communication channel;

a protocol converter coupled to the ADSL modem, the protocol converter configured to:
convert the protocol of data packets, transmitted from the LAN to the remote device, from a LAN protocol to an ADSL protocol, and
convert the protocol of data packets, transmitted from the remote device to the LAN, from the ADSL protocol to the LAN protocol; and a plurality of switching port controllers coupled to each other by an address bus and a data bus, each respective switching port controller coupled between said protocol converter and one of the plurality of LAN segments, said switching port controllers each comprising:
a port coupled to one of said LAN segments, and
an address table storing source addresses of devices connected to said one of said LAN segments, wherein each of the switching port controllers is configured to:
receive data packets from said port, said data packets including a destination address,
determine whether the destination address matches an address stored in any one of the respective address tables associated with the plurality of switching port controllers,
forward the data packet, when a match exists, to its destination via the switching port controller that stores the matching address, and
forward the data packet when no match exists, to the protocol converter.

15. The device of claim 14, wherein when determining whether the destination address matches an address stored in any one of the respective address tables, the switching port controller is configured to:
compare the destination address of the data packet to the addresses stored in its address table, and
forward the destination address of the data packet via the address bus to an other one of said switching port controllers when no match exists.

16. The device of claim 15, wherein when a match exists, the switching port controller is further configured to:

forward the data packet via the data bus to a switching port controller that stores an address that matches the destination address of the data packet.

17. A device for controlling communications between a wide area network (WAN) and remote devices via a plurality of ADSL communication channels, comprising:

a WAN protocol converter coupled to the WAN, the protocol converter configured to:
convert the protocol of data packets, transmitted from the WAN to one of the remote devices, from a WAN protocol to a first protocol, and
convert the protocol of data packets, transmitted from the remote devices to the WAN, from the first protocol to the WAN protocol; and a plurality of ADSL channel controllers coupled to each other by an address bus and a data bus, each respective ADSL channel controller including an ADSL modem coupled to one of said ADSL channels and a switching port controller coupled between said WAN protocol converter and said ADSL modem, each of said switching port controllers comprising:
an address table storing source addresses of devices connected to said ADSL channels, wherein each of the switching port controllers is configured to:
receive data packets via the ADSL modem, said data packets including a destination address,
determine whether the destination address matches an address stored in any one of the respective address tables associated with the plurality of switching port controllers,
forward the data packet, when a match exists, to its destination via the switching port controller that stores the matching address, and
forward the data packet, when no match exists, to the WAN protocol converter.

18. The device of claim 17, wherein when determining whether the destination address matches an address stored in any one of the respective address tables, the switching port controller is configured to:

compare the destination address of the data packet to the addresses stored in its address table, and
forward the destination address of the data packet via the address bus to an other one of said switching port controllers when no match exists.

19. The device of claim 18, wherein when a match exists, the switching port controller is further configured to:

forward the data packet via the data bus to a switching port controller that stores an address that matches the destination address of the data packet.

20. The device of claim 17, further comprising:

an ADSL protocol converter coupled to said ADSL modem for converting data packets received from the ADSL modem to the first protocol.

* * * * *